US008862251B2

(12) United States Patent
Oiwa et al.

(10) Patent No.: US 8,862,251 B2
(45) Date of Patent: Oct. 14, 2014

(54) CONTROLLER FOR MACHINE TOOL AND MACHINING-RELATED DATA PROCESSING SYSTEM PROVIDED THEREWITH

(75) Inventors: Kazuhiko Oiwa, Yamatokoriyama (JP); Takayuki Nakamura, Yamatokoriyama (JP); Masanori Murozumi, Yamatokoriyama (JP); Makoto Ideue, Yamatokoriyama (JP)

(73) Assignee: DMG Mori Seiki Co., Ltd., Nara (JP)

( * ) Notice: Subject to any disclaimer, the term of this patent is extended or adjusted under 35 U.S.C. 154(b) by 396 days.

(21) Appl. No.: 13/218,671

(22) Filed: Aug. 26, 2011

(65) Prior Publication Data

US 2012/0065767 A1 Mar. 15, 2012

(30) Foreign Application Priority Data

Sep. 9, 2010 (JP) .................................. 2010-201678
Aug. 3, 2011 (JP) .................................. 2011-169709

(51) Int. Cl.
*G05B 19/409* (2006.01)

(52) U.S. Cl.
CPC .... *G05B 19/409* (2013.01); *G05B 2219/35414* (2013.01); *G05B 2219/36169* (2013.01)
USPC ................. 700/83; 700/86; 702/183; 703/14; 705/7.22; 706/50

(58) Field of Classification Search
CPC .. G05B 15/02; G05B 19/042; G05B 19/0426; G05B 19/409; G05B 23/02; G05B 23/0254; G06N 5/02; G06F 17/5036; G06F 17/5022; G06F 17/5045; G06F 17/504
USPC ........ 700/83, 86; 702/183; 703/14; 705/7.22; 706/50
See application file for complete search history.

(56) References Cited

U.S. PATENT DOCUMENTS

| 6,885,984 | B1 * | 4/2005 | Suzuki et al. | 703/22 |
| 7,546,232 | B2 * | 6/2009 | Brooks et al. | 702/183 |
| 2004/0128120 | A1 * | 7/2004 | Coburn et al. | 703/26 |
| 2005/0278670 | A1 * | 12/2005 | Brooks et al. | 716/5 |

FOREIGN PATENT DOCUMENTS

JP 2006-085485 3/2006

* cited by examiner

*Primary Examiner* — Kavita Padmanabhan
*Assistant Examiner* — Douglas Lee
(74) *Attorney, Agent, or Firm* — Miller, Matthias & Hull LLP

(57) ABSTRACT

A machining-related data processing system has a configuration in which a controller for machine tool comprising an NC device and an assisting device is connected to a data processing device via a telecommunication line. The assisting device has a cooperative-processing instructing section transmitting a cooperative processing signal to the data processing device and thereby remotely operating the data processing device to cause it to perform data processing, and receiving the result of the data processing performed in the data processing device, and the data processing device has an automatic program generation section, a machining simulation section and a cooperative-processing executing section receiving the cooperative processing signal from the controller and causing the automatic program generation section and the machining simulation section to perform data processing related to workpiece machining and corresponding to a data processing request accepted in the controller, and transmitting the data processing result to the controller.

6 Claims, 2 Drawing Sheets

CONTROLLER FOR MACHINE TOOL AND MACHINING-RELATED DATA PROCESSING SYSTEM PROVIDED THEREWITH

TECHNICAL FIELD

The present disclosure relates to a controller for machine tool which is provided to be connectable to a data processing device via a telecommunication line and which is configured to remotely operate the data processing device to cause it to perform data processing related to workpiece machining, and a machining-related data processing system which is configured in such a manner that the controller for machine tool and a data processing device are connected to each other via a telecommunication line.

BACKGROUND ART

A controller for machine tool is configured with a CPU, an ROM, an RAM, a hard disk, an input device, a screen display device and other components, and various types of software are stored in the ROM and the hard disk. As such software, there can be mentioned, for example, software for machining simulation as well as software for system control, and as a controller including software for machining simulation, conventionally, the controller disclosed in the Japanese Unexamined Patent Application Publication No. 2006-85485 is known, for example.

In this controller, the hardware, such as a CPU, an ROM, an RAM and a hard disk, and the software function as a main control section, a machining program memory in which an NC program is stored, a model memory in which three-dimensional model data of the tool, the workpiece, the tool rest, the workpiece spindle etc. are stored, a program-analysis control section for analyzing the NC program stored in the machining program memory, a simulation control section for calculating a tool moving path on the basis of the program analysis by the program-analysis control section, a modeling control section for calculating model data of the tool, the workpiece, the tool rest and the workpiece spindle which are being moved relatively along the tool moving path on the basis of the result of the calculation by the simulation control section and the model data stored in the model memory, a model-rendering control section for generating image data on the basis of the model data calculated by the modeling control section, and the like. The image data generated by the model-rendering control section is displayed on the screen display device under the display control by the main control section.

An operator checks the movement state of the tool and the machining state through the displayed images of the tool and the workpiece which are being moved according to the NC program, thereby checking whether there is any error in the NC program.

SUMMARY OF DISCLOSURE

However, in the above conventional controller, since all processing (processing executed by the software) is executed on one set of hardware (a so-called computer), the load applied to the controller is likely to become large depending on processing details and there is a possibility that the execution of processing is hindered when a large load is applied, for example, the processing speed is decreased. This situation is likely to occur particularly when processing in which a large load is applied to the controller, such as machining simulation as described above, is executed. Further, if a large load is applied to the controller during workpiece machining, there can occur a situation where the workpiece cannot be machined.

Furthermore, the software is often upgraded for the purpose of adding new functions or improving convenience for use, and it is then possible that the required hardware specs are increased. However, there is a possibility that, if the upgraded software is executed without increasing the specs of the hardware, the surplus processing capacity of the hardware is reduced and other processing are therefore hindered when a load is applied.

If the specs of the hardware are increased, the above-described problem hardly occurs even if a larger load is applied. However, it is not easy to increase the specs of hardware and the cost thereof is very high.

The present disclosure has been achieved in view of the above-described circumstances, and an object thereof is to provide a controller for machine tool capable of reducing the load applied to the controller itself and a machining-related data processing system provided therewith.

The present disclosure, for achieving the above-described object, relates to a controller for machine tool which is provided to be connectable to a data processing device via a telecommunication line and which is configured to cause the data processing device to perform data processing, characterized in that the controller has cooperative-processing instructing means which, when accepting a data processing request, transmits to the data processing device a cooperative processing signal for causing the data processing device to execute workpiece-related data processing for the data processing request in cooperation with the controller, and thereby causes the data processing device to execute data processing corresponding to the data processing request, and which receives information on the result of the data processing.

The present disclosure also relates to a machining-related data processing system in which said controller for machine tool is connected to a data processing device via a telecommunication line and the controller is configured to cause the data processing device to perform data processing related to workpiece machining, characterized in that the data processing device has:

processing means for performing data processing; and cooperative-processing executing means which receives the cooperative processing signal from the controller and causes the processing means to perform data processing related to workpiece machining and corresponding to the data processing request accepted in the controller, and which transmits information on the result of the data processing performed by the processing means to the controller.

According to this machining-related data processing system, when, for example, a data processing request input from input means is accepted by the cooperative-processing instructing means or a data processing request included in data processed in the controller is accepted by the cooperative-processing instructing means, a cooperative processing signal is transmitted from the cooperative-processing instructing means to the data processing device. Thereby, the cooperative-processing instructing means causes the data processing device to execute data processing.

The cooperative processing signal transmitted from the cooperative-processing instructing means is received by the cooperative-processing executing means of the data processing device, and thereby the execution of data processing in the processing means is controlled and a data processing related to workpiece machining and corresponding to the data processing request accepted by the cooperative-processing instructing means is performed by the processing means.

The result of the data processing performed by the processing means is transmitted to the controller by the cooperative-processing executing means and the transmitted data processing result is received by the cooperative-processing instructing means.

As the data processing related to workpiece machining, there can be given, for example, tool path data generation, NC program generation, machining simulation and the like, but there is no limitation thereto. Further, the telecommunication line includes, in addition to a LAN and the Internet, for example, various communication lines capable of connecting a controller for machine tool and a data processing device to each other. Furthermore, the controller is a concept which includes both a part for controlling objects to be numerically controlled, such as a feed mechanism, and a part for controlling other components. Therefore, the data processing device may be caused to perform data processing related to the part for controlling objects to be numerically controlled or to perform data processing related to the part for controlling other components.

Further, a configuration is possible in which the controller further has display means for screen display and the cooperative-processing instructing means receives, from the data processing device, image information displayed on a display screen of the data processing device and displays the image information on a display screen of the display means, transmits to the data processing device a remote operation signal for causing the data processing device to execute the data processing as the cooperative processing signal, the remote operation signal being input through the display screen of the data processing device displayed on the display means, and thereby causes the data processing device to execute the data processing, and receives information obtained after the completion of the data processing from the data processing device directly or indirectly.

In this case, displaying the display screen of the data processing device on the display means of the controller and transmitting to the data processing device a signal input through the display screen of the data processing device displayed on the display means causes the data processing device receiving the signal to execute data processing according to the received signal, that is, a so-called remote operation is executed and thereby the data processing device executes data processing according to the received signal. The cooperative-processing instructing means receives information obtained after the completion of the data processing from the data processing device directly or indirectly. Specifically, in a case where, for example, automatic NC-program generation is performed, when software for the execution of automatic program generation is activated on the data processing device by clicking an icon for activating the software on the display screen of the data processing device displayed on the display means of the controller, the display screen of the data processing device on which the software is activated is displayed on the display means of the controller, and data necessary for the automatic program generation is input in the display screen of the data processing device displayed on the display means and thereby the data processing device is caused to execute the automatic program generation. Thereafter, the controller can receive only the program generated by the data processing device.

Alternatively, a configuration is possible in which the controller further has display means for screen display and the cooperative-processing instructing means receives, from the data processing device, image information displayed on a display screen of the data processing device and displays the image information on the display means, transmit to the data processing device a remote operation signal for causing the data processing device to execute the data processing as the cooperative processing signal, the remote operation signal being input through the display screen of the data processing device displayed on the display means, and thereby causes the data processing device to execute the data processing, and receives information obtained during the data processing from the data processing device directly or indirectly and displays the information on the display means.

In this case also, similarly to the above, displaying the display screen of the data processing device on the display means of the controller and transmitting to the data processing device a signal input through the display screen of the data processing device displayed on the display means causes the data processing device receiving the signal to execute data processing according to the received signal. The cooperative-processing instructing means receives information obtained during the data processing from the data processing device directly or indirectly and displays the received information on the display means. Specifically, in a case where, for example, machining simulation is executed, when software for the execution of machining simulation is activated on the data processing device by clicking an icon for activating the software on the display screen of the data processing device displayed on the display means of the controller, the display screen of the data processing device on which the software is activated is displayed on the display means of the controller, and data necessary for the machining simulation is input in the display screen of the data processing device displayed on the display means of the controller and thereby the data processing device is caused to execute the machining simulation based on the input data, during which the controller receives information on the machining simulation executed by the data processing device and displays the received information on the display means in real time.

It is noted that the "cooperative processing" in the application indicates causing the data processing device to execute at least a part of the data processing which should be executed by the controller. Further, as the mode of transmitting the cooperative processing signal, in addition to the above-described remote operation which is interactively performed between the controller and the data processing device, there can be given a mode in which the cooperative processing signal is transmitted from the controller to the data processing device in a one-way manner.

Further, the controller for machine tool may further have a machining executing section for executing workpiece machining on the basis of the data processing result received by the cooperative-processing instructing means from the data processing device. In this case, workpiece machining is performed on the basis of the data processing result received from the data processing device (for example, tool path data or an NC program generated in the data processing device).

Thus, according to the controller for machine tool and the machining-related data processing system disclosed herein, since they are configured in such a manner that the controller for machine tool transmits a cooperative processing signal to the data processing device and thereby causes the data processing device to perform data processing related to workpiece machining and information on the result of the data processing is transmitted from the data processing device to the controller, a part of the processing conventionally executed in a controller for machine tool can be performed in an external data processing device.

Therefore, the load applied to the controller can be reduced and it can be avoided that the processing performed in the controller is hindered. Further, even when software is upgraded, since the upgraded software can be executed in the data processing device as long as the hardware of the data processing device meets the required specs, the upgraded software can be executed without hindering other processing even if the specs of the hardware of the controller are not increased.

DESCRIPTION OF EMBODIMENTS

Hereinafter, a specific embodiment of the present disclosure will be described on the basis of the accompanying drawings. It is noted that, in the embodiment, software for data processing shall be installed both in a controller for machine tool and in a data processing device so that the controller can execute data processing alone. However, the mode of installation is not necessarily limited thereto. Further, in the embodiment, cooperative processing shall be performed by a remote operation. The remote operation in the embodiment indicates that the controller receives image information displayed on a display screen of the data processing device from the data processing device and displays the information on its display device, and transmits, to the data processing device, a signal input through the display screen of the data processing device displayed on the display device, thereby operating the data processing device from the controller side.

Figure 1:
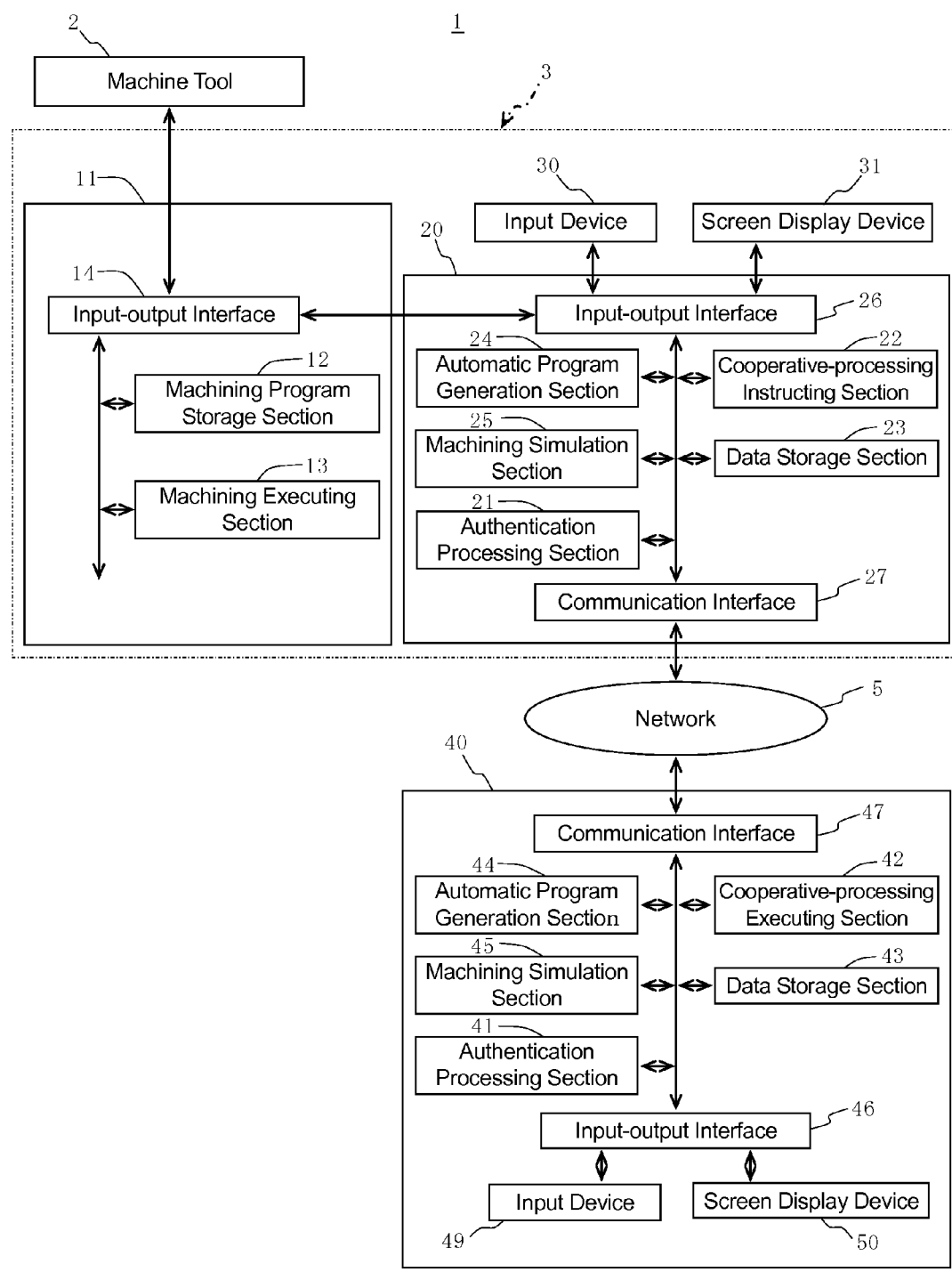
FIG. 1 is a block diagram showing a schematic configuration of a machining-related data processing system according to one embodiment of the present disclosure.

As shown in FIG. 1, a machining-related data processing system 1 of the embodiment is provided on a machine tool 2 and is configured in such a manner that a controller 3 comprising an NC device 11 and an assisting device 20, which are connected to each other, is connected to a data processing device 40 via a network (telecommunication line) 5, such as a LAN and the Internet, and the controller 3 remotely operates the data processing device 40 and thereby causes the data processing device 40 to perform data processing related to workpiece machining.

The NC device 11 has functional sections, such as a machining program storage section 12, a machining executing section 13 and an input-output interface 14, comprising a CPU, an ROM, an RAM and hard disk and appropriate software stored therein. The machining program storage section 12 has an NC program stored therein and the machining executing section 13 controls the operation of the machine tool 2 on the basis of the NC program stored in the machining program storage section 12 or an NC program generated by the data processing device 40. The input-output interface 14 is connected to the machine tool 2 and to an input-output interface 26 which will be described later.

The assisting device 20 has an input device 30 for inputting various data and signals, a screen display device 31 on which image data is displayed, and functional sections, such as an authentication processing section 21, a cooperative-processing instructing section 22, a data storage section 23, an automatic program generation section 24, a machining simulation section 25, an input-output interface 26 and a communication interface 27, comprising a CPU, an ROM, an RAM and a hard disk and appropriate software stored therein, and has a configuration in which the CPU, the ROM, the RAM, the hard disk, the input device 30 and the screen display device 31 are integrally provided on an operation panel, and the assisting device 20 is connected to the network 5 via the communication interface 27. It is noted that the input-output interface 26 is connected to the input device 30, to the screen display device 31 and to the input-output interface 14.

The authentication processing section 21 executes an authentication processing in response to an authentication request from the data processing device 40.

The data storage section 23 has data necessary for data processing such as NC program generation and machining simulation stored therein, and the automatic program generation section 24 automatically generates an NC program on the basis of machining data, such as tool type, tool size, raw-material type and machining trajectory, and cutting conditions, such as feed rate and rotational speed of spindle, stored in the data storage section 23 and the machining simulation section 25 executes machining simulation on the basis of an NC program and three-dimensional model data of the tool, the workpiece, the tool holding mechanism and the workpiece holding mechanism. It is noted that the data stored in the data storage section 23 is input from the input device 30 or is input from the outside via the network 5, for example.

The cooperative-processing instructing section 22 accepts a data processing request which is input from the input device 30, for example. When accepting the data processing request, the cooperative-processing instructing section 22 transmits, to the data processing device 40, a cooperative processing signal for causing the data processing device 40 to execute data processing and thereby remotely operates the data processing device 40, thereby causing the data processing device 40 to perform data processing related to workpiece machining and corresponding to the accepted data processing request.

Further, the cooperative-processing instructing section 22 receives the result of the data processing executed in the data processing device 40, and displays the received data processing result (for example, simulation images) on the screen display device 31 or stores the received data processing result (for example, an NC program) in an appropriate storage section in the controller 3. For example, when the data processing performed in the data processing device 40 is an automatic generation of NC program, the cooperative-processing instructing section 22 receives the generated NC program from the data processing device 40 and stores it in the machining program storage section 12.

The data processing device 40 has an input device 49 for inputting various data and signals, a screen display device 50 on which image data is displayed and functional sections, such as an authentication processing section 41, a cooperative-processing executing section 42, a data storage section 43, an automatic program generation section 44, a machining simulation section 45, an input-output interface 46 and a communication interface 47, comprising a CPU, an ROM, an RAM and a hard disk and appropriate software stored therein, and is connected to the network 5 via the communication interface 47. It is noted that the input-output interface 46 is connected to the input device 49 and to the screen display device 50.

The authentication processing section 41 makes an authentication request to the assisting device 20 when data processing is executed in the automatic program generation section 44 or the machining simulation section 45. Thereafter, it is made possible to execute data processing in the automatic program generation section 44 or the machining simulation section 45.

The cooperative-processing executing section 42 receives the cooperative processing signal transmitted from the cooperative-processing instructing section 22 and causes the automatic program generation section 44 or the machining simulation section 45 to perform data processing corresponding to the data processing request accepted in the cooperative-processing instructing section 22, and transmits, to the cooperative-processing instructing section 22, the result of the data processing performed by the automatic program generation section 44 or the machining simulation section 45.

The data storage section 43 has data necessary for data processing stored therein and the automatic program generation section 44 is a functional section which, similarly to the automatic program generation section 24 of the assisting device 20, automatically generates an NC program on the basis of machining data, such as tool type, tool size, raw-material type and machining trajectory, and cutting conditions, such as feed rate and rotational speed of spindle, stored in the data storage section 43. The automatic generation of NC program is performed under the control by the cooperative-processing executing section 42.

Similarly, the machining simulation section 45 is a functional section which, similarly to the machining simulation section 25 of the assisting device 20, performs machining simulation on the basis of an NC program and three-dimensional model data of the tool, the workpiece, the tool holding mechanism and the workpiece holding mechanism stored in the data storage section 43, and generates a simulation image of the machining simulation. This data processing is also performed under the control by the cooperative-processing executing section 42.

Figure 2:
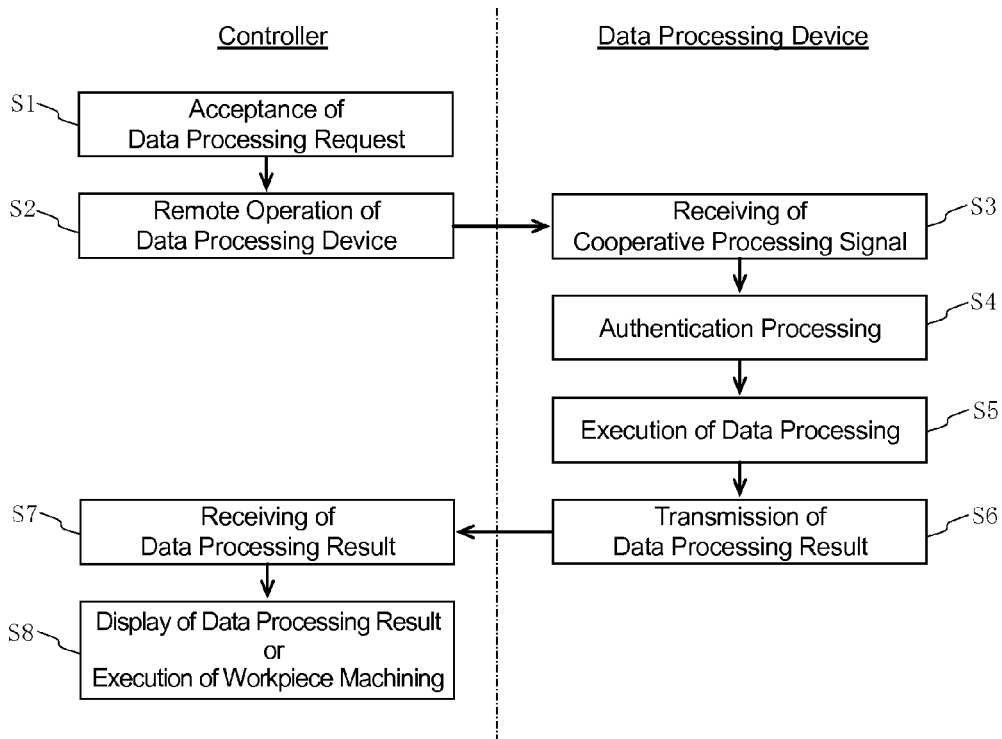
FIG. 2 is a flow chart showing a sequence of steps performed when data processing is executed in the embodiment.

The processes for executing program generation and for executing machining simulation by means of the data processing system 1 of the embodiment thus configured will be descried referring to FIG. 2. It is noted, that in the embodiment, although the controller 3 for the machine tool 2 can execute program generation and machining simulation alone because the controller 3 and the data processing device 40 each have the automatic program generation section 24, 44 and the machining simulation section 25, 45, program generation and machining simulation are executed in the data processing device 40 so that a load is not applied to the controller 3.

First, in the controller 3, a data processing request input from the input device 30 (a machining-simulation execution request or an NC-program generation request) is accepted by the cooperative-processing instructing section 22 (Step S1). Then, a cooperative processing signal is transmitted by the cooperative-processing instructing section 22 to the data processing device 40 and thereby the data processing device 40 is remotely operated (Step S2).

It is noted that the remote operation indicates that, when, in the display screen of the data processing device 40 displayed on the screen display device 31, for example, an icon is selected by a mouse click or numeral values or the like are input, the cooperative-processing instructing section 22 transmits, to the cooperative-processing executing section 42, a signal corresponding to the operation as a cooperative processing signal, thereby causing the data processing device 40 to recognize that the icon is selected or the numeral values are input. More specifically, software functioning as the automatic program generation section 44 or the machining simulation section 45 on the data processing device 40 can be activated by clicking an icon for activating the software on the screen display device 31, and numeral values or the like can be input in the data processing device 40 through the display screen of the data processing device 40 displayed on the screen display device 31.

The cooperative processing signal transmitted from the cooperative-processing instructing section 22 is received by the cooperative-processing executing section 42 in the data processing device 40 (Step S3), and an authentication processing is performed by the authentication processing sections 21, 41 between the controller 3 and the data processing device 40 (Step S4). Subsequently, the cooperative-processing executing section 42 causes the automatic program generation section 44 or the machining simulation section 45 to execute data processing related to workpiece machining and corresponding to the data processing request accepted by the cooperative-processing instructing section 22 (NC program generation or machining simulation) (Step S5).

In a case where the data processing is NC program generation, the automatic program generation section 44 generates an NC program on the basis of machining data, such as tool type, tool size, raw-material type and machining trajectory, and cutting conditions, such as feed rate and rotational speed of spindle, stored in the data storage section 43, the generated NC program is transmitted to the controller 3 by the cooperative-processing executing section 42 (Step S6), and the transmitted NC program is received by the cooperative-processing instructing section 22 (Step S7). In the controller 3, workpiece machining is executed by the machining executing section 13 on the basis of the received NC program (Step S8).

On the other hand, in a case where the data processing is machining simulation, the machining simulation section 45 executes data processing on the basis of an NC program and three-dimensional model data of the tool, the workpiece, the tool holding mechanism and the workpiece holding mechanism stored in the data storage section 43. When the data processing is executed, the generated simulation images from the start to the end of the machining simulation are transmitted in sequence to the controller 3 by the cooperative-processing executing section 42 (Step S6) and the transmitted simulation images are received by the cooperative-processing instructing section 22 (Step S7) and then displayed on the screen display device 31 (Step S8).

Figure 3:
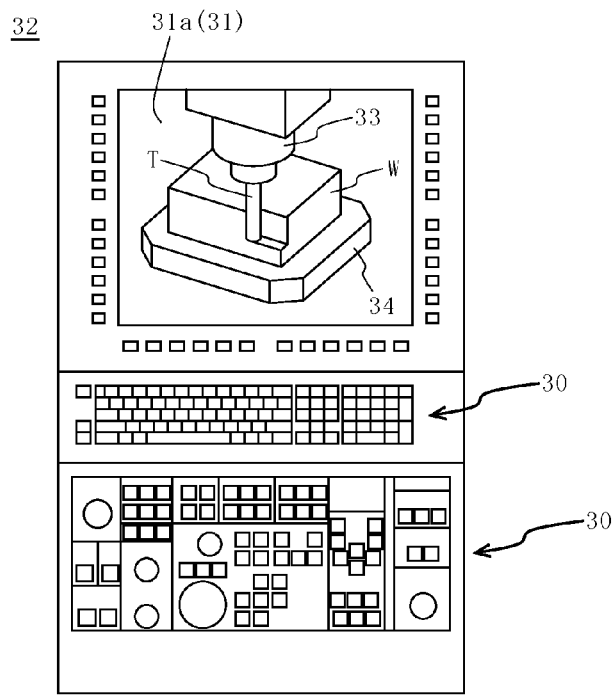
FIG. 3 is an illustration showing an example of an image displayed on a screen display device of a controller according to the embodiment.

An example of the then displayed images is shown in FIG. 3. In FIG. 3, the reference numeral 32 designates the operation panel, the reference numeral 31a designates a display screen of the screen display device 31, the reference sign T designates the tool, the reference sign W designates the workpiece, the reference numeral 33 designates a spindle, and the reference numeral 34 designates a pallet attached on a table.

It is noted that the result of the data processing performed by the machining simulation section 45 may be displayed on the screen display device 50 by the machining simulation section 45.

Thus, according to the machining-related data processing system 1 of the embodiment, the controller 3 for the machine tool 2 remotely operates the data processing device 40 and thereby causes the data processing device 40 to perform data processing, and the result of the data processing is transmitted from the data processing device 40. Therefore, NC program generation and machining simulation, which have conventionally been executed in the controller 3, can be executed in the data processing device 40, which is externally provided.

Therefore, the load applied to the controller 3 can be reduced and it can be avoided that the processing in the controller 3 is hindered. Further, even when software for data processing is upgraded, since the upgraded software can be executed in the data processing device 40 as long as the hardware of the data processing device 40 meets the required specs, the upgraded software can be executed without hindering the execution of software for system control and other software even if the specs of the hardware of the controller 3 are not increased.

Thus, one embodiment of the disclosure has been described. However, the present disclosure should not be limited thereto and other embodiments are possible.

In the above embodiment, machining simulation and NC program generation are given as examples of the data processing related to workpiece machining. However, there is no limitation to the data processing related to workpiece machining, and, in addition to them, tool path data generation and the like are also possible. Further, a configuration is possible in which the controller 3 is caused to perform data processing in which a small load is applied and the data processing device 40 is caused to perform data processing in which a large load is applied, and a configuration is also possible in which the data processing device 40 is caused to perform even data processing in which a small load is applied.

Further, a configuration is possible in which the controller 3 does not have the functional sections performing data processing, such as the automatic program generation section 24 and the machining simulation section 25, and the data processing device 40 performs all data processing.

Further, the cooperative-processing instructing section 22 may be configured to transmit the data stored in the data storage section 23 together with the cooperative processing signal. In this case, the automatic program generation section 44 and the machining simulation section 45 may be configured to, when data processing is executed in the data processing device 40, perform data processing on the basis of the data transmitted from the data storage section 23 or on the basis of both of the data stored in the data storage section 43 and the data transmitted from the controller 3.

Furthermore, although, in the data processing system 1, the controller 3 for the machine tool 2 is connected to the data processing device 40 via the network 5 in a one-to-one relationship, one or more controllers 3 for machine tools 2 may be connected to one or more data processing devices 40 via the network 5.

Further, the controller 3 for the machine tool 2 and the data processing device 40 may be configured to transmit and receive the cooperative processing signal and the data processing result via a file sharing server or the like. Specifically, a file sharing server is connected to the network 5, and the cooperative processing signal is transmitted from the cooperative-processing instructing section 22 to the file sharing server via the network 5 and then transmitted from the file sharing server to the cooperative-processing executing section 42. On the other hand, the data processing result is transmitted from the cooperative-processing executing section 42 to the file sharing server via the network 5 and then transmitted from the file sharing server to the cooperative-processing instructing section 22. At this time, the data processing result such as an NC program may be stored in the file sharing server for an optional time period.

Furthermore, the data processing device 40 may further have a state monitoring section for monitoring the states of other machine tools which are connected to the network 5. In this case, it is possible to cause the state monitoring section to monitor the machine tools connected to the network 5, and, when abnormality occurs on one or more of the machine tools, notify the controller 3 of the occurrence of abnormality.

Further, although, in the above embodiment, the data processing request is input in the controller 3 via the input device 30, the data processing request is not limited thereto and may be caused to be included in a program to be executed in the NC device 11 or the assisting device 20 or included in data to be processed by the NC device 11 or the assisting device 20. In this case, the cooperative-processing instructing section 22 of the assisting device 20 transmits, to the cooperative-processing executing section 42 of the data processing device 40, a cooperative processing signal for the data processing request included in the program to be executed or in the data to be processed, thereby causing the cooperative-processing executing section 42 to execute data processing corresponding to the data processing request.

Specifically, for example, in a case where an NC program to be executed by the machining executing section 13 is caused to include a specific code for cooperative processing (for example, a read-ahead command), when the specific code is recognized by the machining executing section 13 during the execution of the NC program, a cooperative processing signal corresponding to the code is transmitted to the cooperative-processing executing section 42 via the cooperative-processing instructing section 22 and thereby data processing is executed in the data processing device 40, and the result of the data processing is transmitted to the controller 3 via the cooperative-processing executing section 42.

On the other hand, in machining simulation, it is possible to employ a mode in which data to be processed in machining simulation is caused to include a code for cooperative processing with respect to a specific shape or a highly complex shape, and when the code is recognized by the machining simulation section 25 during processing the data, a cooperative processing signal corresponding to the code is transmitted to the cooperative-processing executing section 42 via the cooperative-processing instructing section 22 and thereby the machining simulation section 45 of the data processing device 40 is caused to execute data processing, and the cooperative-processing executing section 42 transmits the result of the data processing to the cooperative-processing instructing section 22 point by point and the cooperative-processing instructing section 22 displays the received data processing result on the screen display device 31. In this way also, it is possible to reduce the load applied to the controller 3. It is noted that, in this case, the NC device 11 and the assisting device 20 may be integrally configured.

What is claimed is:

1. A controller for a machine tool connectable to an external data processing device provided as a separate device via a telecommunication line network and configured to cause the data processing device to perform data processing, wherein:

the controller has display means for screen display and cooperative-processing instructing means which, when accepting a data processing request, transmits via the network to the data processing device a cooperative processing signal for causing the data processing device to execute workpiece-related data processing for the data processing request in cooperation with the controller, and thereby causes the data processing device to execute data processing corresponding to the data processing request, and which receives information on the result of the data processing from the data processing device via the network; and the cooperative-processing instructing means is configured to receive image information to be displayed on a display screen of the data processing device from the data processing device via the network and display the image information on the display means, transmit via the network to the data processing device a remote operation signal for causing the data processing device to execute the data processing as the cooperative processing signal, the remote operation signal being input through the display screen of the data processing device displayed on the display means, and thereby cause the data processing device to execute the data processing, and receive information obtained after the completion of the data processing from the data processing device directly or indirectly via the network.

2. A controller for a machine tool connectable to an external data processing device provided as a separate device via a network and configured to cause the data processing device to perform data processing, wherein:

the controller has display means for screen display and cooperative-processing instructing means which, when accepting a data processing request, transmits via the network to the data processing device a cooperative processing signal for causing the data processing device to execute workpiece-related data processing for the data processing request in cooperation with the controller, and thereby causes the data processing device to execute data processing corresponding to the data processing request, and which receives information on the result of the data processing from the data processing device via the network; and the cooperative-processing instructing means is configured to receive image information to be displayed on a display screen of the data processing device from the data processing device via the network and display the image information on the display means, transmit via the network to the data processing device a remote operation signal for causing the data processing device to execute the data processing as the cooperative processing signal, the remote operation signal being input through the display screen of the data processing device displayed on the display means, and thereby cause the data processing device to execute the data processing, and receive information obtained during the data processing from the data processing device directly or indirectly via the network and display the information on the display means.

3. The controller for machine tool according to claim 1, wherein the controller further has a machining executing section executing workpiece machining on the basis of the result of the data processing received from the data processing device via the network.

4. A machining-related data processing system in which the controller for machine tool according to claim 1 is connected to an external data processing device provided separately from the controller via a telecommunication line network and the controller is configured to cause the data processing device to perform data processing related to workpiece machining, wherein the data processing device has:

processing means for performing data processing; and cooperative-processing executing means which receives the cooperative processing signal from the controller via the network and causes the processing means to perform data processing related to workpiece machining and corresponding to the data processing request accepted in the controller, and which transmits via the network to the controller information on the result of the data processing executed by the processing means.

5. The controller for machine tool according to claim 2, wherein the controller further has a machining executing section executing workpiece machining on the basis of the result of the data processing received from the data processing device via the network.

6. A machining-related data processing system in which the controller for machine tool according to claim 2 is connected to an external data processing device provided separately from the controller via a network and the controller is configured to cause the data processing device to perform data processing related to workpiece machining, wherein the data processing device has:

processing means for performing data processing; and cooperative-processing executing means which receives the cooperative processing signal from the controller via the network and causes the processing means to perform data processing related to workpiece machining and corresponding to the data processing request accepted in the controller, and which transmits via the network to the controller information on the result of the data processing executed by the processing means.

* * * * *